United States Patent Office 3,634,346
Patented Jan. 11, 1972

3,634,346
OXIDATION OF CYCLIC AMINES TO LACTAMS
James E. McKeon, Thornwood, N.Y., and David J. Trecker, South Charleston, W. Va., assignors to Union Carbide Corporation, New York, N.Y.
No Drawing. Filed Aug. 15, 1969, Ser. No. 850,630
Int. Cl. C07d 41/00
U.S. Cl. 260—239.3 A
11 Claims

ABSTRACT OF THE DISCLOSURE
A liquid phase oxidation reaction whereby a cyclic amine having an unsubstituted methylene moiety adjacent to the ring nitrogen is converted to the corresponding lactam by reacting the amine with a hydroperoxide in the presence of a metal ion catalyst.

---

This invention relates to a novel process for the production of lactams.

The prior art processes for the production of lactams are varied. Lactams have been prepared previously by ring closure of amino acids or their derivatives. For example, ε-aminobutanoic acid is heated to give 2-pyrrolidone. U.S. Pat. 3,095,423 describes the reaction of α,ω-dicyanoethane with ammonium hydroxide and hydrogen in the presence of a palladium catalyst at 150° C. to give 2-pyrrolidone. This compound has also been produced by reacting the methyl ester of 3-cyanopropanoic acid with hydrogen at 500 p.s.i. and 170° C. in the presence of a nickel catalyst and is shown in U.S. Pat. 2,843,600.

Lactams have also been produced by the aminolysis of lactones. The reaction of ε-caprolactone with ammonia at 250° C. gives ε-caprolactam and is shown in U.S. Pat. 3,000,880. U.S. Pat. 3,133,085 shows the aminolysis of butyrolactone at 250° C. in the presence of $H_3BO_3$ to give 2-pyrrolidone.

The Beckmann rearrangement of a ketoxime has also been used. U.S. Pat. 3,090,739 describes such a reaction for the production of ε-caprolactam after the ketoxime has been prepared from cyclohexane. British Pat. 958,637 also shows a two-step process for the manufacture of ε-caprolactam via the Beckmann rearrangement of the ketoxime after formation of the ketoxime from the reaction of cyclohexane and nitric oxide in the presence of a mercury catalyst and ultraviolet light.

The production of lactams has also been accomplished employing the Schmidt reaction of hydrazic acid with a cycloalkanone. A reaction involving cyclohexanone and hydrazic acid in the presence of $H_3PO_4$ gives ε-caprolactam.

The prior art methods are characterized by one or more of the following disadvantages: high reaction temperatures, long reaction times, the employment of large amounts of catalyst, and the presence of large amounts of undesired side reaction products caused by the lack of selectivity in the process of the site to be oxidized.

It would be desirable to be able to manufacture lactams by the direct oxidation of cyclic amines. This process would permit the use of a starting material with the properly determined ring size and would also allow a selective oxidation, namely at the position adjacent to the ring nitrogen. Such a reaction would be capable of directly producing lactams.

It is an object of the invention to produce lactams in a process substantially free of the foregoing disadvantages.

This and other objects will become obvious by the following description of the invention.

It has now been found that lactams can be manufactured directly from their corresponding cyclic amines. The reaction is characterized by its ability to take place at ambient conditions, short reaction times, and the use of only trace amounts of catalyst.

The novel oxidation process consists of contacting while in the liquid phase a cyclic amine having at least one unsubstituted methylene position adjacent to the ring nitrogen with a hydroperoxide in the presence of a metal ion catalyst. The general reaction is portrayed thusly:

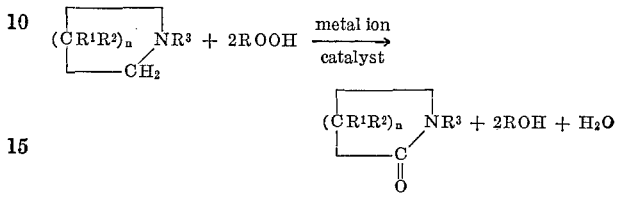

where $R^1$, $R^2$, and $R^3$ may be alike or different and are selected from the group consisting of hydrogen, alkyl having from 1 to 20 carbon atoms, aryl having from 6 to 18 carbon atoms, aralkyl having from 7 to 14 carbon atoms, alkaryl having from 7 to 14 carbon atoms and heterocyclyl having from 2 to 9 carbon atoms; R is selected from the group consisting of alkyl having from 1 carbon atom and alkaryl having from 7 to 14 carbon atoms and $n$ is an integer from 2 to 13.

Representative examples of the cyclic amines and their corresponding lactams are set out in the following table:

| Cyclic amine | Corresponding lactam |
| --- | --- |
| Trimethyleneimine | β-Propriolactam. |
| Pyrrolidine | 2-pyrrolidone. |
| Piperidine | 2-piperidone. |
| Hexamethyleneimine | ε-Caprolactam. |
| Heptamethyleneimine | Lactam of 7-aminoheptanoic acid. |
| Decamethyleneimine | Lactam of 10-aminodecanoic acid. |
| Tetradecamethyleneimine | Lactam of 14-aminotetradecanoic acid. |
| N-methylpyrrolidine | N-methyl-2-pyrrolidone. |
| N-phenyloctamethyleneimine | N-phenyl lactam of 8-aminooctanoic acid. |
| 3-n-butylpiperidine | 3-n-butyl-2-pyrrolidone. |
| 4-(2-furanyl)hexamethyleneimine | 4-(2-furanyl)-ε-caprolactam. |
| Do | 5-(2-furanyl)-ε-caprolactam. |
| 1,2,3,4-tetrahydroquinoline | Lactam of 2-(2-carboxyethyl)-aniline. |
| Octahydroisoquinoline | Lactam of 2-(2-aminoethyl)cyclohexanecarboxylic acid. |
| Do | Lactam of 2-(aminomethyl)-cyclohexanacetic acid. |
| 2,2-dimethylpiperidine | 6,6-dimethyl-2-piperidone. |
| 2,3-dihydroindole | 4,5-dehydro-2-pyrrolidone. |

Cyclic amines of more complexity than those indicated above may also be oxidized by this procedure. For example, unsaturated amines, diamines, amines containing an extra hetero-atom in the ring, amines bearing additional functional groups, polymers of N-vinyl amines, etc., may be converted to their corresponding lactams if they bear an unsubstituted methylene group adjacent to the ring nitrogen.

Typical examples of these cyclic amines and their corresponding lactams are listed below:

| Cyclic amine | Corresponding lactam |
| --- | --- |
| 1,2,3,4-tetrahydropyridine | 5,6-dehydropiperidone. |
| 1,2-dihydropyridine | 2-pyridone. |
| 2,3-dihydropyrrole | Lactam of 4-amino-3-butenoic acid. |
| 2,5-dihydropyrrole | Lactam of 4-amino-2-butenoic acid. |
| 4,4'-dipiperidine | 4-(4-piperidinyl)-2-piperidone. |
| Morpholine | 4-oxa-2-piperidone. |
| 4-piperidone | 4-keto-2-piperidone. |
| 3,4-dichloropyrrolidone | 4,5-dichloro-2-pyrrolidone. |
| Poly(N-vinyl-pyrrolidine) | Segments of poly(N-vinly-2-pyrrolidone). |
| Hexahydropyrimidine | N,N'-trimethyleneurea. |
| 1,4-diaza-bicyclo-[2.2.2]octane | 1,4-diazobicyclo[2.2.2]octan-2-one. |
| 1-azabicyclo-[2.2.2]octane | 1-azabicyclo[2.2.2]octan-2-one. |
| 1,4-piperazine | 4-aza-2,2-piperidone. |
| Do | Piperazine-2,5-dione. |

Representative examples of the hydroperoxides which may be used in the process of this invention are ethyl hydroperoxide, n-propyl hydroperoxide, t-butyl hydroperoxide, t-amyl hydroperoxide, cumene hydroperoxide, benzyl hydroperoxide, 1-tetralin hydroperoxide, p-tolyl hydroperoxide, p-dioxane-2-hydroperoxide, sec.-butyl hydroperoxide and the like. Particularly useful are the tertiary hydroperoxides such as t-butyl hydroperoxide, t-amyl hydroperoxide, and cumene hydroperoxide.

Metal ion catalysts which may be used to bring about the oxidation are selected from the Group 4A, 5A, 6A, 7A, 8 and 1B metals with Group 7A and 8 metals preferred. Several oxidation states of the same metal may be used, such as manganese(II) and maganese(III). Various counter ions may be used with the metal, preferably the simple acid salts such as the stearates, caproates, and acetates. Bidentate ligands such as acetylacetate, acetylacetonate, and ortho-phenanthroline may also be used.

Examples of effective catalysts include vanadyl acetylacetonate, vanadic triacetonate, chromium triacetate, chromoyl caproate, manganic stearate, ferrous o-phenanthroline, ferric acetylacetonate, cobalt octanoate, cobalt naphthenate, cuprous acetate, cupric stearate, and the like. Especially preferred are the cobalt and manganese catalysts.

In operation, the preferred embodiment is the combination of t-butyl hydroperoxide and cobalt naphthenate.

The ingredients can be combined in a variety of ways, bearing in mind that the reaction must take place in the liquid phase. The cyclic amine, the hydroperoxide, and the catalyst can be mixed together simultaneously; the catalyst can be added in increments to a solution of hydroperoxide and amine; the hydroperoxide can be added incrementally to a solution of the catalyst and amine; or a solution of the catalyst and amine can be added incrementally to the hydroperoxide. The last alternative is the one preferred for the reaction can be more easily controlled if the catalyst and amine are added gradually to the hydroperoxide.

The mole ratio of hydroperoxide to amine can range from 5:1 to 0.01:1, with a preferred range between 2:1 and 0.05:1 and a most preferred range between 1:1 and 0.1:1.

No solvent is necessary in order to effect the reaction, but one can be present as long as it remains inert to hydroperoxide attack and metal coordination. In practice, it is best to use the alcohol corresponding to the hydroperoxide employed; for example, t-butyl alcohol is used as the solvent when t-butyl hydroperoxide is used as the oxidant. Commercial grade hydroperoxide often contains unreacted alcohol, thus causing it to be normally present in the reaction mixture.

The reaction temperature can range from about −30° C. and lower to 120° C. and higher with a preferred range of 0° to 100° C. and a most preferred range of 20° to 60° C.

The reaction atmosphere can be ambient, oxygen enriched, or inert containing gases such as nitrogen, argon, and helium.

The amount of metal ion catalyst which is added to the reaction mixture is not narrowly critical and need only be added in amounts effective to initiate the reaction. An additional advantage of the instant process is that large amounts of catalyst are not required. The preferred range of catalyst is from 0.0001 mole percent or lower to about 0.1 mole percent or higher based upon the hydroperoxide employed. Any amount can be used as long as it is catalytically effective. There is no limit to the upper range other than economic considerations.

Lactams find their greatest use in synthetic fiber preparation, particularly in condensation polymers, and more particularly in polyamides or "nylons," as they are called. ε-Caprolactam is an intermediate in the preparation of nylon-6. Another widely used polyamide fiber is nylon-4, which results from the polymerization of 2-pyrrolidone. Pyrrolidone is further used as an intermediate in the production of N-vinyl pyrrolidone which is in addition polymerized to form poly(N-vinyl pyrrolidone). The polymer is used as a cosmetic base and as a blood plasma substitute.

The following examples are illustrative of the invention.

EXAMPLE I 0.1 g. manganic acetylacetonate was added to a solution of pyrrolidine (7.1 g., 0.1 mole) and 69% t-butyl hydroperoxide (26.1 g., 0.2 mole of hydroperoxide) in a brine bath which was kept at −4° C. for three hours. Perchloric acid titration was used to analyze the solution at the end of the period after the brine bath was removed, and the solution stirred at room temperature for 24 hours. Vapor phase chromatography was used to detect the presence of 2-pyrrolidone. 67.2% of the pyrrolidine had been reacted, producing 2-pyrrolidone in an 8.3% yield ($5.6 \times 10^{-3}$ mole).

EXAMPLE II

A solution consisting of 4.1 g. pyrrolidine (96.5% pure), 8.5 g. of 66.4% t-butyl hydroperoxide, and 1 drop of 6% cobalt naphthenate was stirred at room temperature for 142 hours. At the end of this period, perchloric acid titration indicated that 42.5% of the pyrrolidine had reacted, while sodium iodide-sodium thiosulfate analysis indicated that essentially no peroxide remained. Vapor phase chromatography (V.P.C.), showed the presence of $3.7 \times 10^{-3}$ mole of 2-pyrrolidone which was a 15.5% yield based upon pyrrolidine.

EXAMPLE III

Room temperature stirring of a solution of 4.14 g. of piperidine, 8.6 g. of t-butyl hydroperoxide (66.4% solution) and 1 drop of 6% cobalt naphthenate was continued for a period of 52 hours. Analysis indicated the presence of $1.2 \times 10^{-3}$ mole of 2-piperidone making it a 6.3% yield based upon piperidine.

EXAMPLE IV

A solution of 4.00 g. of hexamethyleneimine, 8.7 g. of 66.4% t-butyl hydroperoxide, and 2 drops of 6% cobalt naphthenate was stirred for 20 minutes at room temperature, encountering a violent exotherm which subsided after several minutes duration. Stirring was continued for an additional 49 hours and the solution was analyzed as in the previous examples. There was $7.9 \times 10^{-4}$ mole of ε-caprolactam present, amounting to a 4.5% yield based upon hexamethyleneimine.

EXAMPLE V

A solution consisting of 2.0 g. of pyrrolidine, 2.0 g. of 80% cumene hydroperoxide and 1 drop of 6% cobalt naphthenate was stirred at room temperature for 48 hours. Analysis showed the formation of 2-pyrrolidone at the end of this time.

EXAMPLE VI

Room temperature stirring for 48 hours of a solution consisting of 1.7 g. of pyrrolidine, 0.2 g. of 68.2% t-butyl hydroperoxide, and 0.01 g. of cuprous acetate was undertaken. At the end of this period, V.P.C. analysis indicated the presence of 2-pyrrolidone.

EXAMPLE VII

V.P.C. analysis showed the presence of 2-pyrrolidone after a solution consisting of 1.7 g. of pyrrolidine, 2.0 g. of 68.2% t-butyl hydroperoxide and 0.01 g. of chromium (III) acetylacetonate was agitated at room temperature for 48 hours.

EXAMPLE VIII

Pyrrolidine (1.7 g.) was mixed with 2.0 g. of 68.2% t-butyl hydroperoxide and 0.01 g. of manganous acetylacetonate at room temperature and the solution was allowed to stand for 48 hours. Vapor phase chromatography scans showed the presence of 2-pyrrolidone at the end of this time.

EXAMPLE IX

Ambient temperature stirring for 48 hours was conducted upon a solution consisting of 1.7 g. of pyrrolidine, 2.0 g. of 68.2% t-butyl hydroperoxide and 0.01 g. of ferric acetylacetonate. Analysis by V.P.C. at the end of this time showed that 2-pyrrolidone was formed.

EXAMPLE X

A solution consisting of 1.7 g. of pyrrolidine, 2.0 g. of 68.2% t-butyl hydroperoxide and 0.01 g. of vanadium oxyacetylacetonate was agitated for 48 hours at room temperature. V.P.C. analysis indicated that 2-pyrrolidone was formed.

EXAMPLE XI

Ambient temperature stirring of a solution of 1.7 g. of pyrrolidine, 2.0 g. of 68.2% t-butyl hydroperoxide and 0.01 g. of dicyclopentadienyl-titanium dichloride was carried out for 48 hours. V.P.C. scans demonstrated the presence of 2-pyrrolidone in the reaction product.

EXAMPLE XII

A solution consisting of 1.7 g. of pyrrolidine, 2.0 g. of 68.2% t-butyl hydroperoxide and 0.01 g. of cerium stannate was mixed and permitted to stand for 48 hours. At the end of the reaction period, V.P.C. analysis showed that 2-pyrrolidone had been formed.

What is claimed is:

1. A method for the preparation of lactams by oxidation of cyclic amines of the formula;

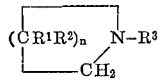

wherein $R^1$, $R^2$ and $R^3$ may be alike or different and are selected from the group consisting of hydrogen, alkyl having from 1 to 20 carbon atoms, aryl having from 6 to 18 carbon atoms, aralkyl having from 7 to 14 carbon atoms, alkaryl having from 7 to 14 carbon atoms and $n$ is an integer from 2 to 13; to form lactams of the formula;

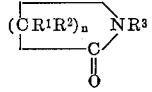

wherein $R^1$, $R^2$ and $R^3$ and $n$ are defined as above: which comprises reacting the cyclic amines, in liquid phase, at a temperature from about minus 30° C. to about plus 120° C., with a hydroperoxide having the formula ROOH, wherein R is a radical selected from the group consisting of alkyl having from 1 to 14 carbon atoms and alkaryl having from 7 to 14 carbon atoms in the presence of a metal ion catalyst wherein the metal ion is selected from the group consisting of Groups 4–A, 5A, 6A, 7A, 8 and 1–B metals.

2. The method of claim 1 wherein said cyclic amine and said metal ion catalyst are gradually added to said hydroperoxide.

3. The method according to claim 1 wherein said hydroperoxide is a tertiary hydroperoxide.

4. The method of claim 1 wherein said metal ion catalyst is a Group 7–A metal.

5. The method of claim 1 wherein said metal ion catalyst is a Group 8 metal.

6. The method of claim 1 wherein said hydroperoxide is t-butyl hydroperoxide.

7. The method of claim 6 wherein said metal ion catalyst is cobalt naphthenate.

8. The method of claim 1 wherein said cyclic amine is pyrrolidine.

9. The method of claim 1 wherein said cyclic amine is piperidine.

10. The method of claim 1 wherein said cyclic amine is hexamethyleneimine.

11. The method of claim 1 wherein said metal ion catalyst is selected from the group consisting of cobalt and manganese catalysts.

References Cited

UNITED STATES PATENTS 3,336,299    8/1967    Fenton   ---------- 260—239.3

NORMA S. MILESTONE, Primary Examiner

R. T. BOND, Assistant Examiner

U.S. Cl. X.R.

260—239 A, 294.7 F, 326.5 FL, 326.5 FN, 289 R, 319.1, 239 B, 347.7, 293 R, 326.8, 268 T, 294.7 B, 247.7 J, 251 R, 88.3 L, 268 DK, 239.3 R; 252—431 C, 431 R